(12) United States Patent
Bradford (10) Patent No.: US 8,973,798 B2
(45) Date of Patent: Mar. 10, 2015

(54) BACKPACK AND PROTECTIVE COVER FOR BICYCLE

(76) Inventor: Lori Louise Bradford, Morgan Hill, CA (US)

( * ) Notice: Subject to any disclaimer, the term of this patent is extended or adjusted under 35 U.S.C. 154(b) by 246 days.

(21) Appl. No.: 13/612,587

(22) Filed: Sep. 12, 2012

(65) Prior Publication Data

US 2013/0062372 A1 Mar. 14, 2013

Related U.S. Application Data (60) Provisional application No. 61/573,831, filed on Sep. 12, 2011.

(51) Int. Cl.
*A45F 4/02* (2006.01)
*B62J 19/00* (2006.01)
*B62J 99/00* (2009.01)
*A45C 13/00* (2006.01)
*A45C 9/00* (2006.01)

(52) U.S. Cl.
CPC . *B62J 99/00* (2013.01); *B62J 19/00* (2013.01); *A45F 4/02* (2013.01); *A45C 13/002* (2013.01); *A45C 2009/007* (2013.01)

USPC ............ 224/577; 224/607; 224/617; 150/167

(58) Field of Classification Search
USPC .......... 150/167; 224/576, 577, 581, 585, 600, 224/607, 617; 206/335; D12/402
See application file for complete search history.

(56) References Cited

U.S. PATENT DOCUMENTS

| 4,598,725 | A  | * | 7/1986 | Brewer ........................... 135/95 |
| 4,756,416 | A  | * | 7/1988 | Johnson ........................ 206/335 |
| 7,757,734 | B2 | * | 7/2010 | Hooker et al. ................. 150/167 |
| 2005/0000990 | A1 | * | 1/2005 | Gilstrap et al. ............... 224/426 |
| 2005/0145660 | A1 | * | 7/2005 | Gilstrap et al. ............... 224/426 |
| 2010/0320248 | A1 | * | 12/2010 | Uimonen ...................... 224/645 |

\* cited by examiner

*Primary Examiner* — Justin Larson
(74) *Attorney, Agent, or Firm* — Sunstone IP (57) ABSTRACT

A durable yet flexible protective bicycle cover is disclosed. The protective cover having properties of insulation from damage, wear, elements, dust and dirt, and the like. The protective cover further includes means for carrying a bicycle while within the cover, means for pushing a bicycle while within the cover, means for lifting a bicycle to and from a motor vehicle while within the cover, and means for transforming the cover into a backpack.

19 Claims, 12 Drawing Sheets

FIG. 7 able cover, the cover further comprises a shoulder strap having opposing
BACKPACK AND PROTECTIVE COVER FOR BICYCLE

CROSS REFERENCE TO RELATED APPLICATION[S]

This application claims priority to U.S. Provisional Patent Application to Bradford entitled "BACKPACK AND PROTECTIVE COVER FOR BICYCLE," Ser. No. 61/573,831, filed Sep. 12, 2011, the disclosure of which is hereby incorporated entirely herein by reference.

BACKGROUND

1. Technical Field

This disclosure relates generally to covers for personal recreational vehicles, and in particular to a multi-purpose bicycle cover.

2. State of the Art

Bicycle enthusiasts often transport their bicycles to and from enjoyable locations to ride at these locations. There are any number of ways to transport a bicycle. Modes of transportation may include, among others: carrying the bicycle, transporting the bicycle within a vehicle, carrying a vehicle attached to a rack on the vehicle, transporting the bicycle within a cargo truck, airplane, etc.

While in transport, a variety of dangers may present themselves. A bicycle that is inside of a vehicle can be hazardous to the upholstery of the vehicle as well as becoming a projectile with sharp edges if and when the vehicle should have to come to an abrupt stop. Although the bicycle is generally protected from the elements while inside a vehicle, it is vulnerable to theft as it can be easily seen through the windows of the vehicle. While attached to a rack outside of a vehicle it is particularly vulnerable to theft as well as natural elements, wind and dust damage, and the like. Cargo trucks are generally used to transport bicycles to and from special events, whereby a plurality of bicycles may be arranged tightly together such that coming into contact with one another can easily cause scratches and chips in the paint, scratches or tears in the seat or hand grips, damage to spokes from a neighboring pedal, and the like.

There is thus a need for a protective cover for bicycles which is suitable for all modes of transportation, as well as the having the ability to be transformed into a backpack.

SUMMARY

This disclosure relates generally to covers for personal recreational vehicles, and in particular to a multi-purpose bicycle cover.

An aspect of the present disclosure includes a cover for a bicycle, the cover comprising: a top portion; a plurality of sidewalls coupled to the top portion, the sidewalls being configured to flex with respect to the top portion; and a plurality of coupling means configured on a perimeter of the sidewalls for releasably coupling the sidewalls to one another to define therebetween a hollow.

Another aspect of the present disclosure includes wherein the top portion further comprises a top pocket, the top pocket having an open end oriented toward the one of the sidewalls.

Another aspect of the present disclosure includes wherein one of the sidewalls further comprises an outer sidewall pocket having an open end oriented toward the top portion.

Another aspect of the present disclosure includes wherein the first edges of the respective sidewalls are releasably coupled to one another and wherein the second edges of the respective sidewalls are releasably coupled to one another.

Another aspect of the present disclosure includes attachment means being in a bottom perimeter of each of the plurality of sidewalls, wherein the attachment means are configured to releasably couple a portion of the bottom edges of the respective sidewalls to one another to define coupled portions and uncoupled portions.

Another aspect of the present disclosure includes wherein under the condition that the bicycle is placed within the hollow, a portion of each wheel of the bicycle protrudes from the uncoupled portions.

Another aspect of the present disclosure includes wherein the cover further comprises an interior pocket configured on an interior surface of the sidewall.

Another aspect of the present disclosure includes attachment means configured on an interior pocket in a bottom perimeter of each of the plurality of sidewalls, each of the interior pockets having a flap to cover the pocket opening, wherein under the condition that the bottom edges of the respective sidewalls are coupled together via the attachment means the flaps of the respective pockets are prevented from opening.

Another aspect of the present disclosure includes wherein the top portion further comprises a plurality of handles configured thereon.

Another aspect of the present disclosure includes wherein a first handle of the plurality of handles is configured centrally along the length of the top portion, a second handle of the plurality of handles is configured proximate the first edge of the top portion, and a third handle of the plurality of handles is configured on the top portion between the first and second handles.

Another aspect of the present disclosure includes wherein the cover further comprises a retainer and an interior strap, the retainer being functionally coupled to an interior surface of the cover and the interior strap being slidably engaged by the retainer.

Another aspect of the present disclosure includes wherein the interior strap is adjustable and is configured to functionally engage the bicycle to releasably secure the cover to the bicycle.

Another aspect of the present disclosure includes wherein the cover further comprises a security device functionally coupled to the interior strap.

Another aspect of the present disclosure includes wherein the cover further comprises a shoulder strap having opposing ends, each of the opposing ends being releasably coupled to an exterior surface of the top portion at a position corresponding to a position of the retainer on the interior surface.

Another aspect of the present disclosure includes wherein the cover further comprises interior connection means configured on an interior surface of the cover and adapted to releasably couple a first end of each of the sidewalls thereto.

Another aspect of the present disclosure includes wherein the cover is configured to fold between an in use position for use with transporting a bicycle therein and a stored position for use as a backpack, the cover further comprising a cinch strap that is configured to extend from the first end of the top portion and, under the condition that the cover is in the stored position, to thread through the first handle in the top portion to secure the cover to itself.

Another aspect of the present disclosure includes a kit for transporting a bicycle, the kit comprising: a bicycle frame cover, the cover comprising: a top portion; a plurality of sidewalls coupled to the top portion, the sidewalls being configured to flex with respect to the top portion; and a plurality of coupling means configured on a perimeter of the sidewalls for releasably coupling the sidewalls to one another to define therebetween a hollow that covers the bicycle; and a bicycle wheel cover, the bicycle wheel cover comprising: a main body defining a storage space; a handle; and a carrying strap, wherein the storage space stores the bicycle wheel.

Another aspect of the present disclosure includes wherein the first edges of the respective sidewalls are releasably coupled to one another and wherein the second edges of the respective sidewalls are releasably coupled to one another.

Another aspect of the present disclosure includes wherein the frame cover further comprises a retainer and an interior strap, the retainer being functionally coupled to an interior surface of the frame cover and the interior strap being slidably engaged by the retainer.

Another aspect of the present disclosure includes wherein the interior strap is adjustable and is configured to functionally engage the bicycle to releasably secure the frame cover to the bicycle.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Figure 1:
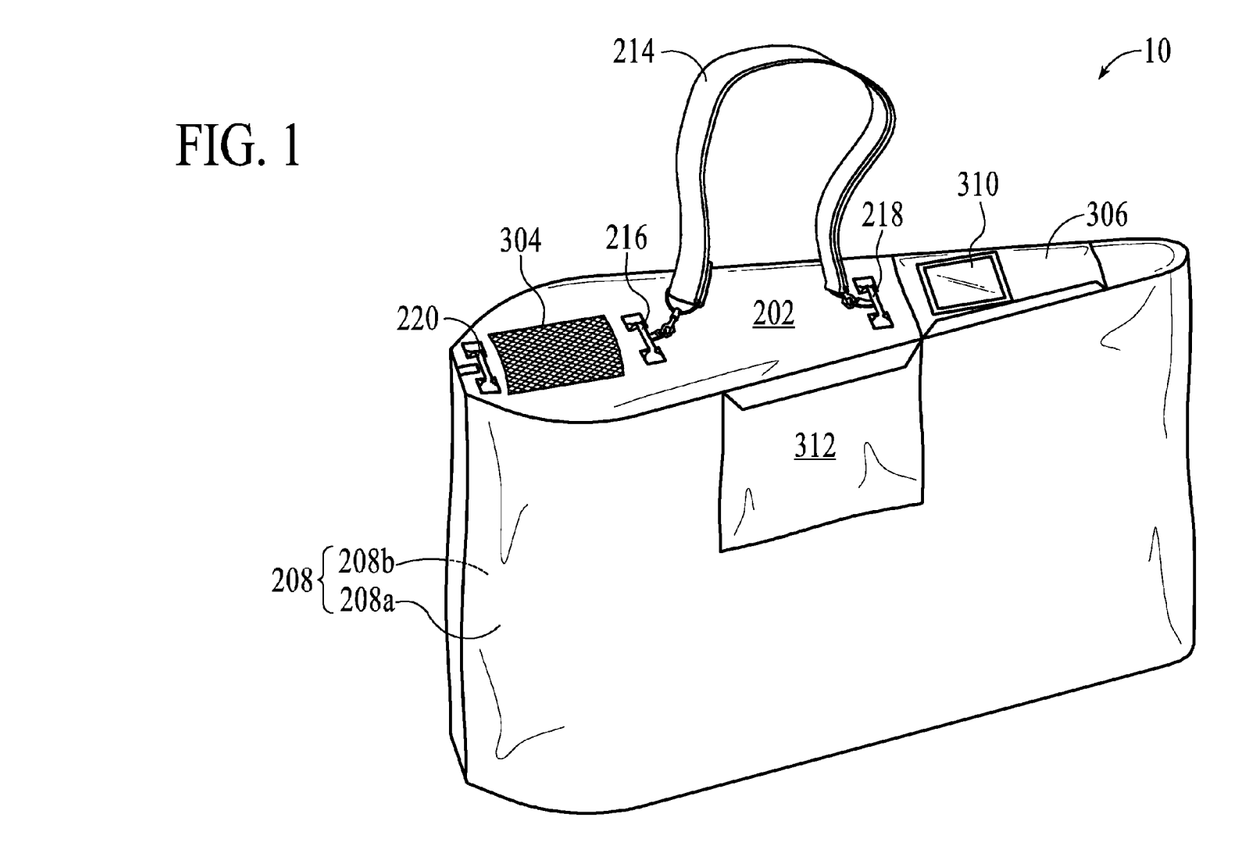
FIG. 1 is a perspective view of a bike cover in accordance with the present disclosure.

Referring to the drawings, FIG. 1 depicts an embodiment of a protective cover 10 in accordance with the present disclosure. The embodiment depicted in FIG. 1 shows the cover 10 of the present invention being assembled, completely expanded, and in-use as a protective cover for a bicycle 200. Embodiments of the protective cover 10 comprise the cover 10 being made of flexible material, water resistant material, durable material, and/or lightweight material. Embodiments of the protective cover 10 comprise a top portion 202 and sidewalls 208. The top portion 202 may be configured to have a streamline shape, wherein the shape includes a rounded initial section that thereafter tapers to a narrower tailing section. Coupled along the length of the top portion 202 is mesh pocket 304, shoulder strap 214, pocket 306, and handles 220, 216, and 218. Coupled to the pocket 306, is a transparent enclosure 310. Protective cover 10 also includes sidewalls 208. The sidewalls 208 may comprise a right side 208a, and a left side 208b (not seen in this view), the top portion 202 and sidewalls 208a and 208b define an interior cavity. The outside surface of the right sidewall 208a may comprise a pocket 312. The open end of the pocket 312 is configured to face an edge surface of the top portion 202. All components shown here, as well as others, will become apparent in the views to follow.

Figure 2:
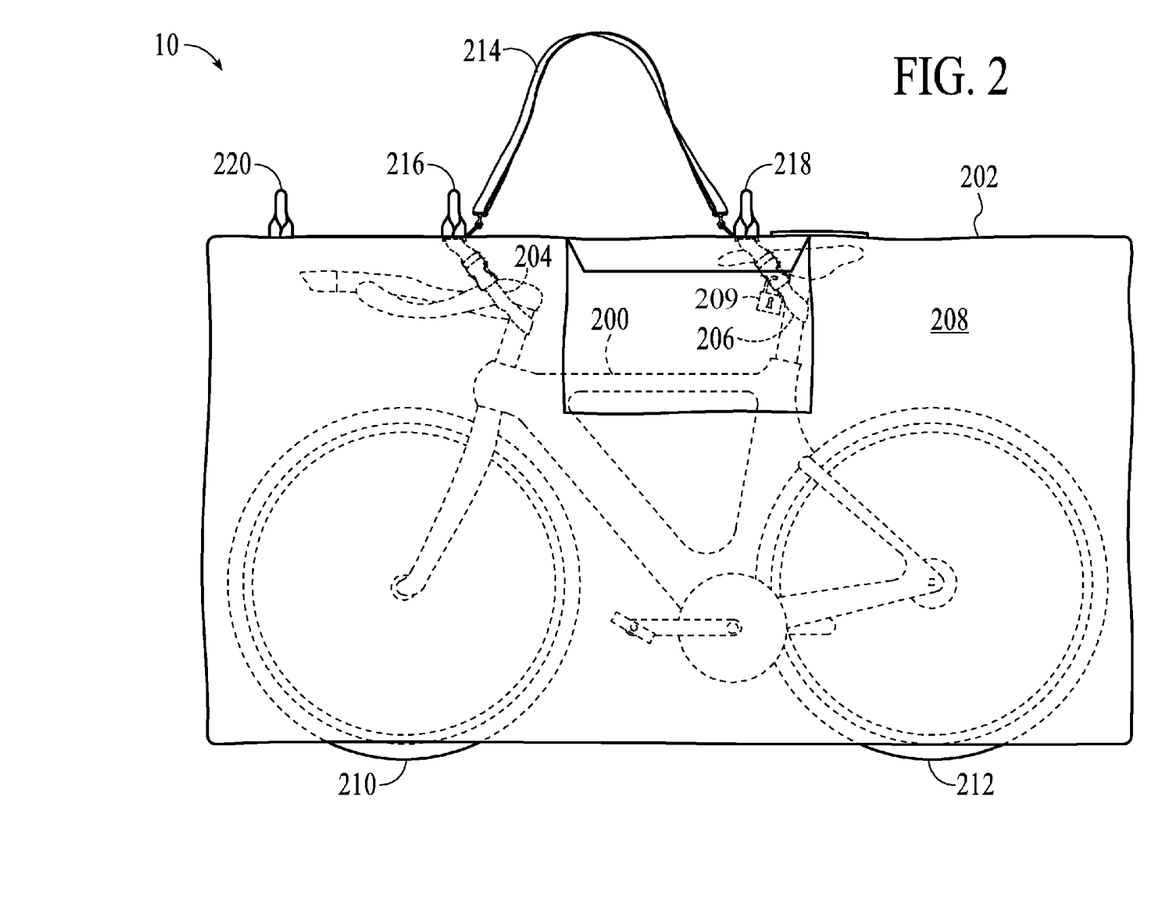
FIG. 2 is a side view of the bike cover in-use, showing a bicycle within the cavity of its entirety; with a portion of the wheels of a bicycle protruding therefrom in accordance with the present disclosure.

Referring now to FIG. 2 whereby the protective cover embodiment of the present invention is generally shown as cover 10. Said protective cover 10 is in-use (user not shown) and includes a bicycle 200 which can be removably coupled to the inside cavity of protective cover 10 by straps 204 and 206. Embodiments of the cover 10 include the straps 204 and 206 being coupled at one end to one of the handles 216 and 218, which are configured in the top portion 202 proximate the base of the strap 214, and being coupled to the bicycle 200 at the other end. The straps 204 and 206 may be configured to be adjustable. The straps 204 and 206 may be configured to be coupled to the handles 216 and 218, respectively, to strengthen the straps 204 and 206 such that they may hold the weight of the bicycle 200. Moreover, the handles 216 and 218 may be configured in the top portion 202 proximate the shoulder strap 214 such that under the condition that the user lifts the cover 10 by way of the shoulder strap 214, the shoulder strap 214 may functionally engage the straps 204 and 206 to also lift and support the bicycle 200 within the cover 10, or support the bicycle 200 with respect to the cover 10. The straps 204 and 206 may be configured to have a quick release mechanism incorporated therein, such that the user may operate the quick release mechanism to quickly disengage the straps 204 and 206 from, or otherwise around, the bicycle 200.

Embodiments of the cover 10 may further comprise either of the straps 204 and 206 including a security device 209, the security device 209 being for example a locking mechanism, a theft-deterrent mechanism, or other anti-theft device, such as a pad lock, key lock, combination lock, or the like. The security device 209 may further comprise an audible alert, a visual alert, or a wireless alert that communicates a wireless communication to a user via a wireless network.

Embodiments of the cover 10 that are configured to engage the bicycle 200 may be generally referred to herein as the "combination". Embodiments of the cover 10 may further comprise the side flaps 208 hanging down over the sides of said bicycle 200, such that the bicycle 200 is enveloped, covered, protected, or otherwise sheltered, except for portions of the wheels 210 and 212, as shown in FIG. 2. The side walls 208a and 208b may have a length slightly longer than a length of the bicycle 200. The sidewalls 208a and 208b may have a length that is substantially similar to the length of the top portion 202. With the sidewalls 208a and 208b hanging over the bicycle 200 as described herein, under the condition that the combination of the cover 10 that functionally engages the bicycle 200 therein is transported by the user, the user may use the normal operating capability of the bicycle 200, i.e., the rolling capability of the wheels 210 and 212, to move, shift, transport, or otherwise relocate, the bicycle 200. These modes of relocating the bicycle 200 include but are not limited to: pushing or pulling the bicycle 200 whereby the protruding wheel portions 210 and 212 roll freely along the ground.

Additional modes of transporting the bicycle 200 within the cover 10 include but are not limited to toting the combination by using an adjustable shoulder strap 214 or by carrying the combination by handles 216 and 218. An additional handle 220 is configured in the top portion 202 proximate a first edge of the cover 10 to assist the user in inserting and removing the combination in and out of a motor vehicle. The handle 220 may be configured to be used in isolation, or may be further configured to be used in conjunction with either handle 216 or 218 for easier lifting of the combination and for balancing the weight of the combination. Embodiments of the cover 10 may further comprise the handle 218 being configured in a central part of the top portion 202, the handle 220 being configured in an initial part of the top portion 202, and the handle 216 being configured somewhere between the handle s218 and 220. Embodiments of the cover 10 may further comprise the handle 216 being centrally configured between the handle s218 and 220.

Figure 3:
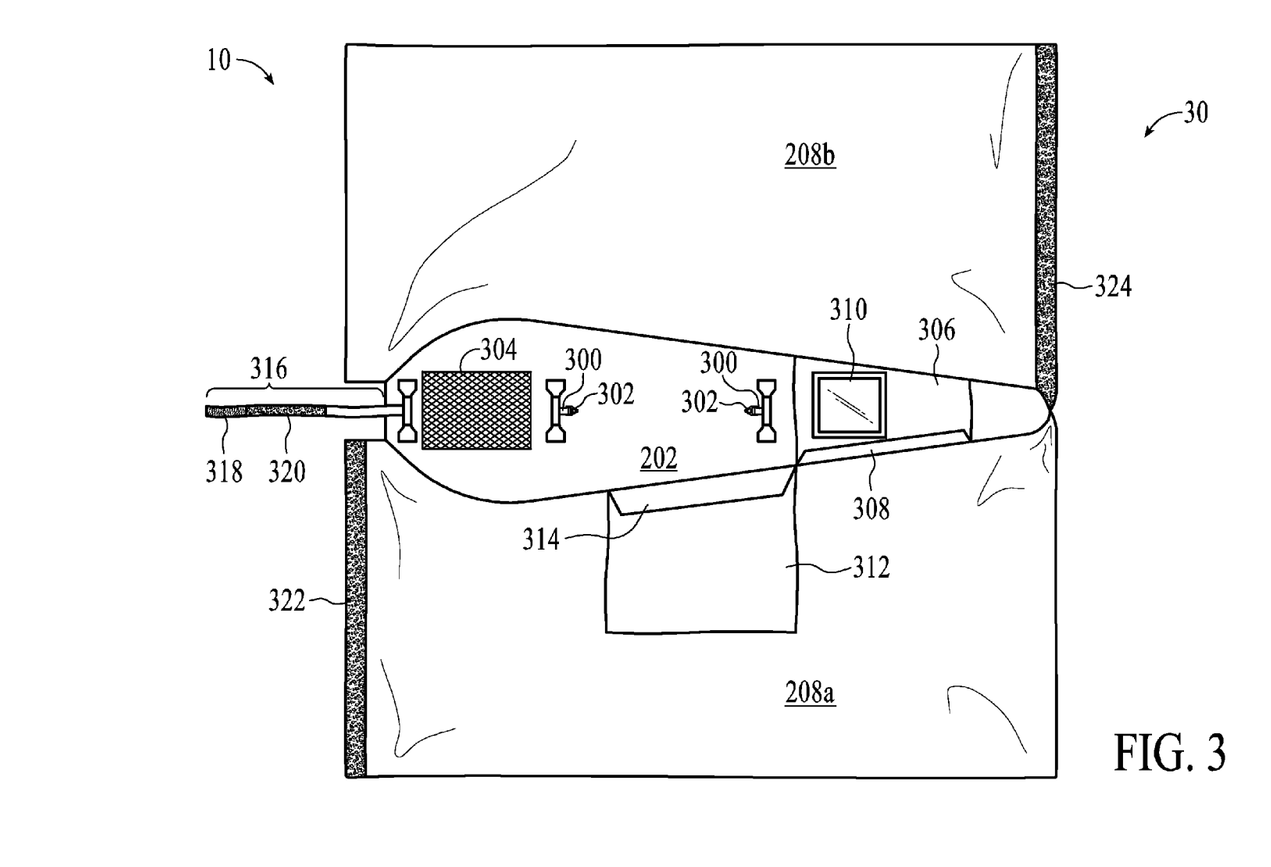
FIG. 3 is an exterior surface view of the bike cover in an open and unfolded position in accordance with the present disclosure.

Referring now to FIG. 3, the exterior surface of the cover 10 in an unfolded and opened-up view is generally shown as exterior surface 30. In this view, the shoulder strap 214 has been removed to more clearly illustrate attachment means thereof. A first end of straps 300 are permanently affixed to top portion 202. Anchor loops 302 are permanently affixed to a distal end of straps 300. The shoulder strap 214, depicted in FIGS. 1 and 2, clips onto said anchor loops 302. Also affixed to top portion 202 is mesh pocket 304 which may be used to store items such as a water bottle, snacks, or the like. Also affixed to the top portion 202 is a pocket 306 having a flap 308 across the open end of the pocket 306. The open end of the pocket 306 is configured to face an edge portion of the top portion 202. On the surface of said pocket 306, a transparent flexible plastic enclosure 310 may be included to store identification information of the user or the bicycle 200. Side flaps 208a and 208b may be permanently affixed to the top portion 202 by fixing means such as stitching or other adhesive means, or, in the alternative, may be releasably coupled to the top portion 202 by releasable means such as a zipper or hook and loop fastener, such that the sidewalls 208a and 208b may be disassembled from the top portion 202, as desired by the user. The sidewall 208a may include a pocket 312 having a flap 314 across the open end of the pocket 312.

Embodiments of the exterior surface 30 of the cover 10 may further comprise coupling means, such as a hook and loop fabric, configured along perimeter edges of the sidewalls 208a and 208b. This enables the sidewalls 208a and 208b to be repeatedly and releasably coupled to one another when the cover 10 folded to its 'in-use' position (as shown in the embodiment of FIGS. 1 and 2). As depicted in FIG. 3, embodiments of the exterior surface 30 may comprise said loop fabric 322 being configured on the sidewall 208a on a first edge thereof, whereas said loop fabric 324 may be configured on the sidewall 208b on a second edge thereof.

Embodiments of the cover 10 may further comprise a cinching strap 316 that may be coupled to the top portion 202 in the initial part thereof, such that the cinching strap 316 is configured proximate the handle 220. The cinching strap 316 may have a predetermined length and may further comprise a surface having a hook portion 318 and a loop portion 320 configured in succession on the surface, which will be discussed in greater detail herein.

Figure 4:
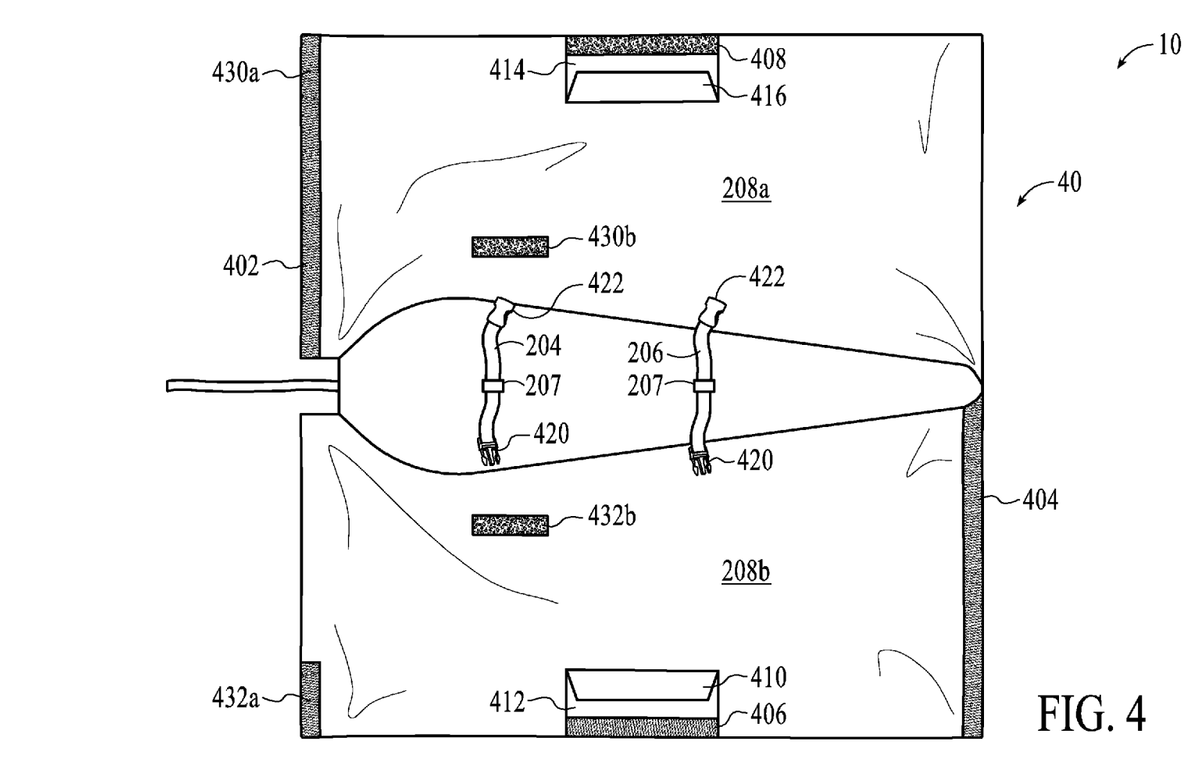
FIG. 4 is an interior surface view of the bike cover in an open and unfolded position in accordance with the present disclosure.

Referring now to FIG. 4, the interior surface of the cover 10 in an unfolded and opened up view is generally shown as interior surface 40. Embodiments of the interior surface 40 of the cover 10 may further comprise coupling means, such as a hook and loop fabric, configured along first and second perimeter edges of the sidewalls 208a and 208b. From the interior surface 40, the hook fabric 402 may be configured on the perimeter edge of sidewall 208a on a first edge thereof, whereas the hook fabric 404 may be configured on the perimeter edge of sidewall 208b on a second edge thereof. The hook fabric 402 and 404 may be configured to correspond to and functionally engage the loop fabric 322 and 324 respectively when the cover 10 is placed in its "in use" position, as depicted in FIGS. 1 and 2. For example, the frontal hook fabric 402 may be coupled to the loop fabric 322, and the hook fabric 404 may be coupled to the loop fabric 324, creating an enclosure which is only open at the bottom and defines therebetween a hollow, wherein the bicycle 200 may be placed.

Embodiments of the interior surface 40 of the cover 10 may further comprise attachment means, such as a hook and loop fabric, configured along bottom perimeter edges of the sidewalls 208a and 208b. For example, the sidewall 208b may be configured to comprise the attachment means such as the hook fabric 406 at a bottom edge of the sidewall 208b, and the sidewall 208a may be configured to comprise the attachment means such as the loop fabric 408 at a bottom edge of the sidewall 208a, the hook and loop fabrics 406 and 408 being configured to functionally engage one another under the condition the cover 10 is placed in its "in use" position. The hook and loop fabric 406 and 408 may be configured centrally in a bottom edge of each sidewall 208b and 208a, respectively, such that under the condition that hook and loop fabrics 406 and 408 functionally engage one another, there remains an opening in the bottom edge of the sidewalls 208a and 208b wherein the bicycle tires 210 and 212 may protrude.

Embodiments of the cover 10 may further comprise the hook and loop fabric 406 and 408 being affixed to the outer surfaces of pockets 412 and 414, respectively. Each pocket may have flaps 410 and 416 respectively across the opening of the pockets. The hook and loop fabric 406 and 408 may be configured on bottom portions of the pockets 412 and 414, respectively, to secure the base of the pockets 412 and 414 to one another during transport of the bicycle in the in use position to help hold the pockets 412 and 414 against one another so that the flaps 410 and 416 do not inadvertently open. These pockets, while usable for any purpose, are primarily intended to store pedals, tools, patch kit, and the like. Although not shown, it is understood that the pocket flaps located within the entirety of the present invention may be joined to their respective pockets with hook and loop, buttons, zippers, snaps, or the like.

Embodiments of the cover 10 further comprise the straps 204 and 206 being slidably coupled to the underside of the top portion 202 by way of retainers 207, the retainers 207 being coupled to the top portion 202. The straps 204 and 206 may move, or otherwise slide, with respect to the retainers 207, but such movement does not disengage the straps 204 and 206 from the retainers. The straps 204 and 206 include fastening means 420 at a first end, and receiving fastening means 422 at a distal end. Said fastening means are fully adjustable and are to be fastened and then tightened to bicycle members. Said bicycle members include but are not limited to gooseneck, handlebars, seat, seat post, and frame.

Figure 5A:
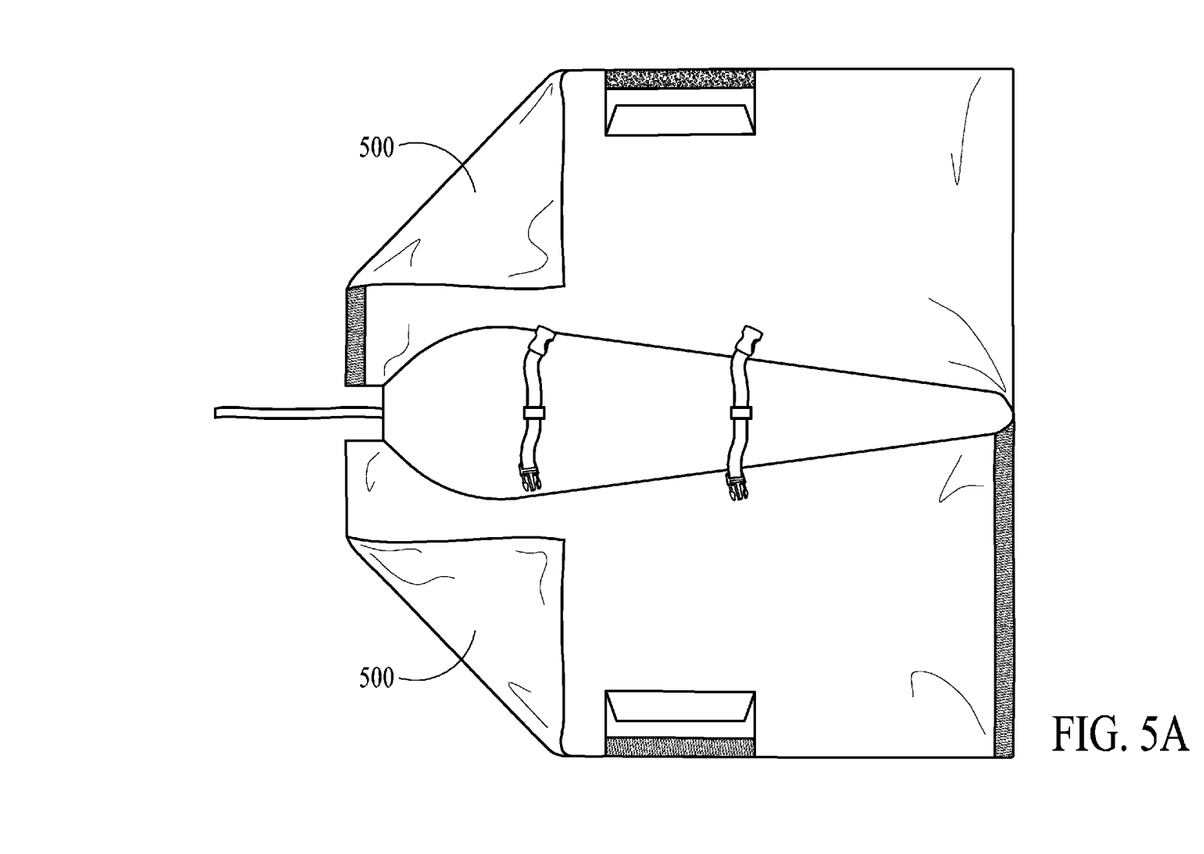
FIGS. 5A and 5B are perspective views of the bike cover demonstrating first folding properties in accordance with the present disclosure.

Embodiments of the cover 10 further comprise the cover 10 being configured to enclose, cover, or otherwise envelop a bicycle 200 that has its front wheel 210 removed therefrom for ease of transportation. For example, there are times when the front wheel 210 may need to be removed from the bicycle 200 in order to provide transportation for the combination in a small vehicle, one with limited space, or to secure the combination to a bike rack. Under the condition that the front wheel 210 is removed, the front parts of sidewalls 208a and 208b may be folded up over the forks of the bicycle 200. The resulting folded portion of the sidewalls 208a and 208b may be secured by utilizing loop connection means 430b and 432b configured on an interior surface 40 of the cover 10 on sidewalls 208a and 208b, respectively. For example, folded portions may be releasably coupled to the interior surface 40 by functionally coupling a portion of hook fabric 402 to connection means 430b and functionally coupling hook fabric 432a to connection means 432b, the result of which is depicted in FIG. 5A. Thereafter, the remaining portion of the hook fabric 402 may be functionally coupled to the remaining portions of the loop fabric 322 (not shown in FIG. 4 or 5), so that the first edges of the sidewalls 208a and 208b can be coupled together despite the folded portions being folded as described herein.

Figure 5B:
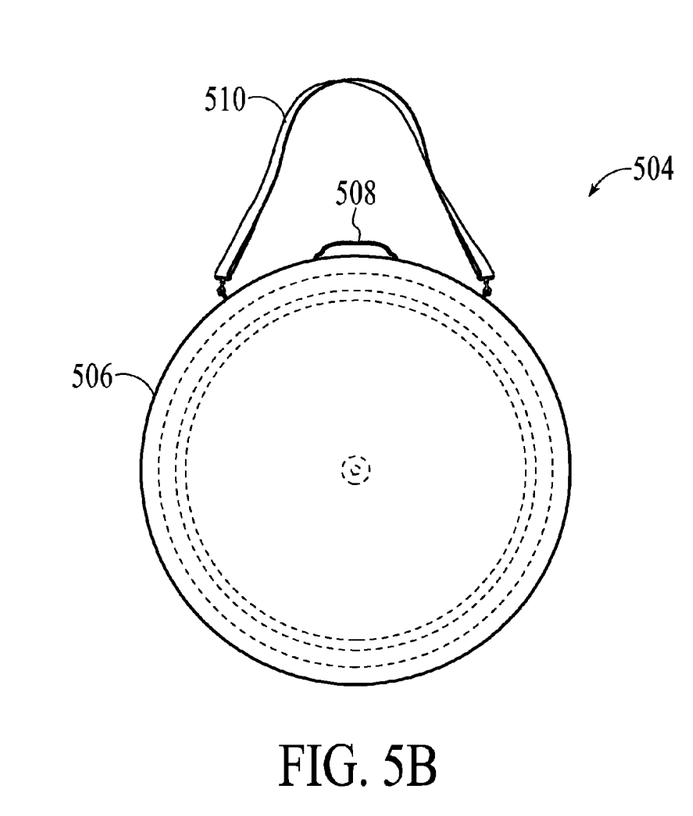

Referring now to FIG. 5A, under the condition that said portions of sidewalls 408a and 408b are in the folded position, smaller flaps 500 are created that cover the forks of the bicycle 200. When the wheel 210 has been removed, it may be placed in an optional storage/tote bag 504 as shown in FIG. 5B. The bag 504 may further comprise a body 506, a carrying handle 508, and a shoulder strap 510. The bag 504 may also include opening and closing means such as hook and loop, zipper, or the like (not shown). The bag 504 and the cover 10 may comprise a bicycle transportation kit, wherein the cover 10 and the bag 504 are utilized together to carry the bicycle 200, having the front wheel 210 removed, and the front wheel 210.

Figure 6A:
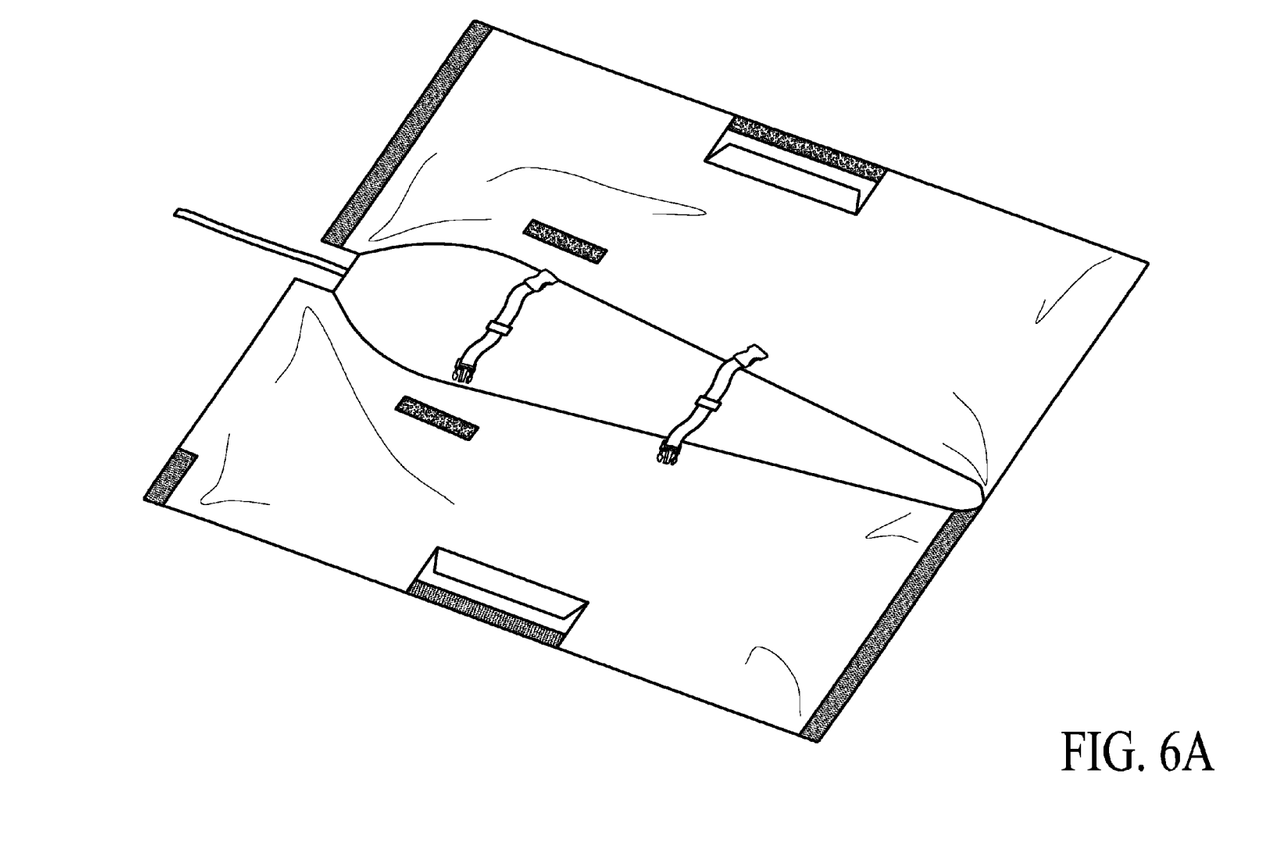
FIG. 6A-6F are perspective views of the bike cover demonstrating second folding properties in accordance with the present disclosure.
Figure 6B:
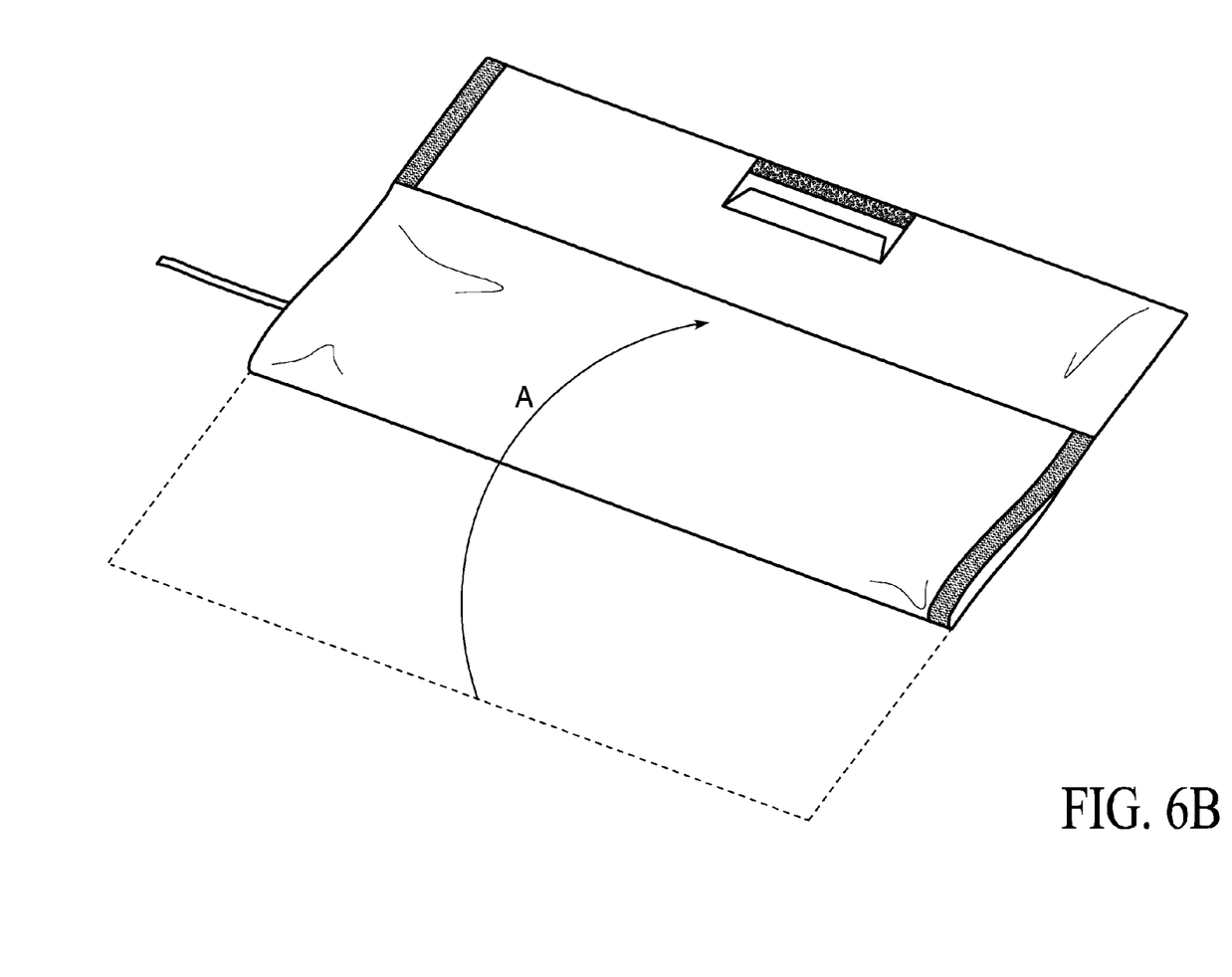
Figure 6C:
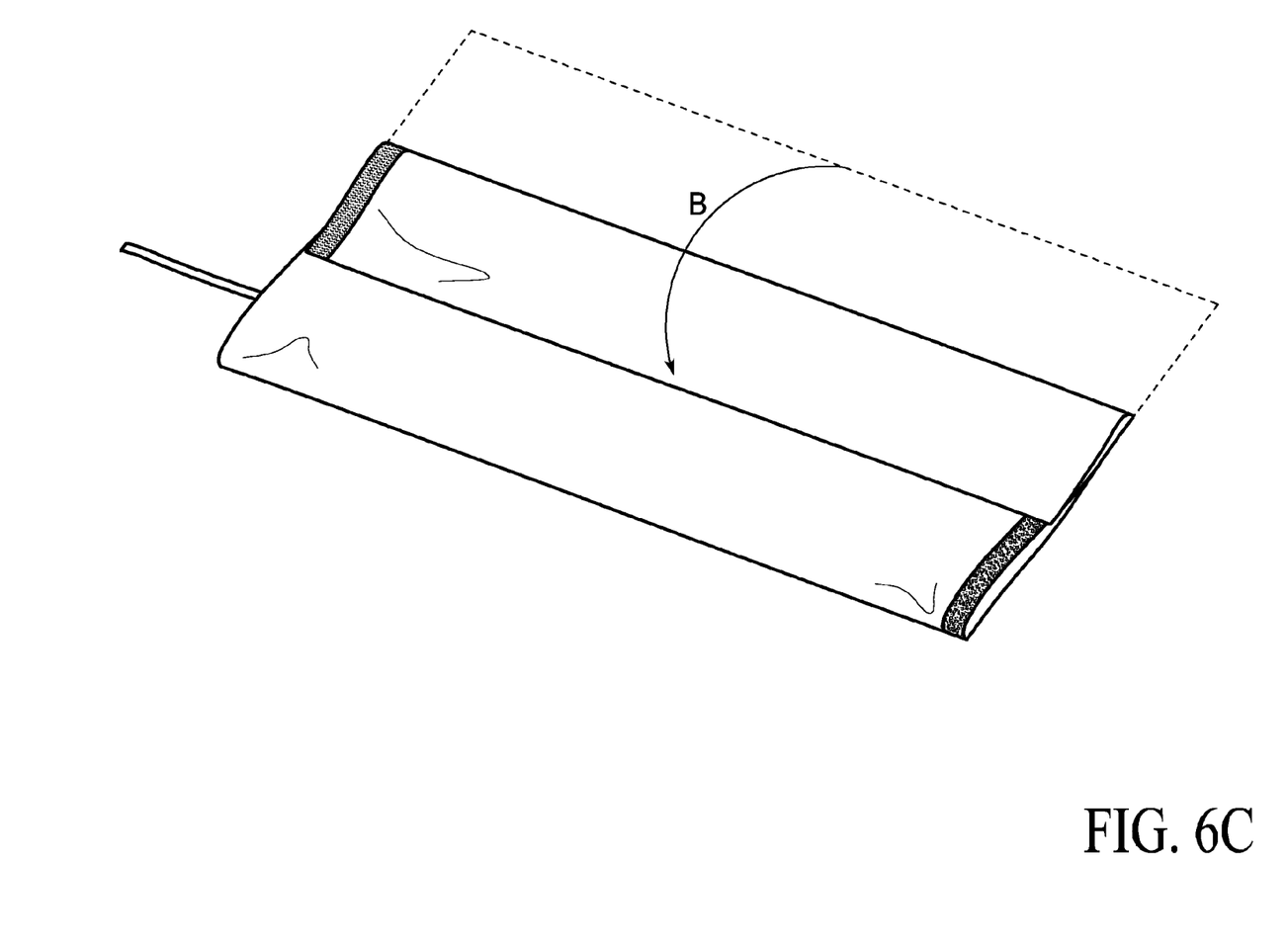
Figure 6D:
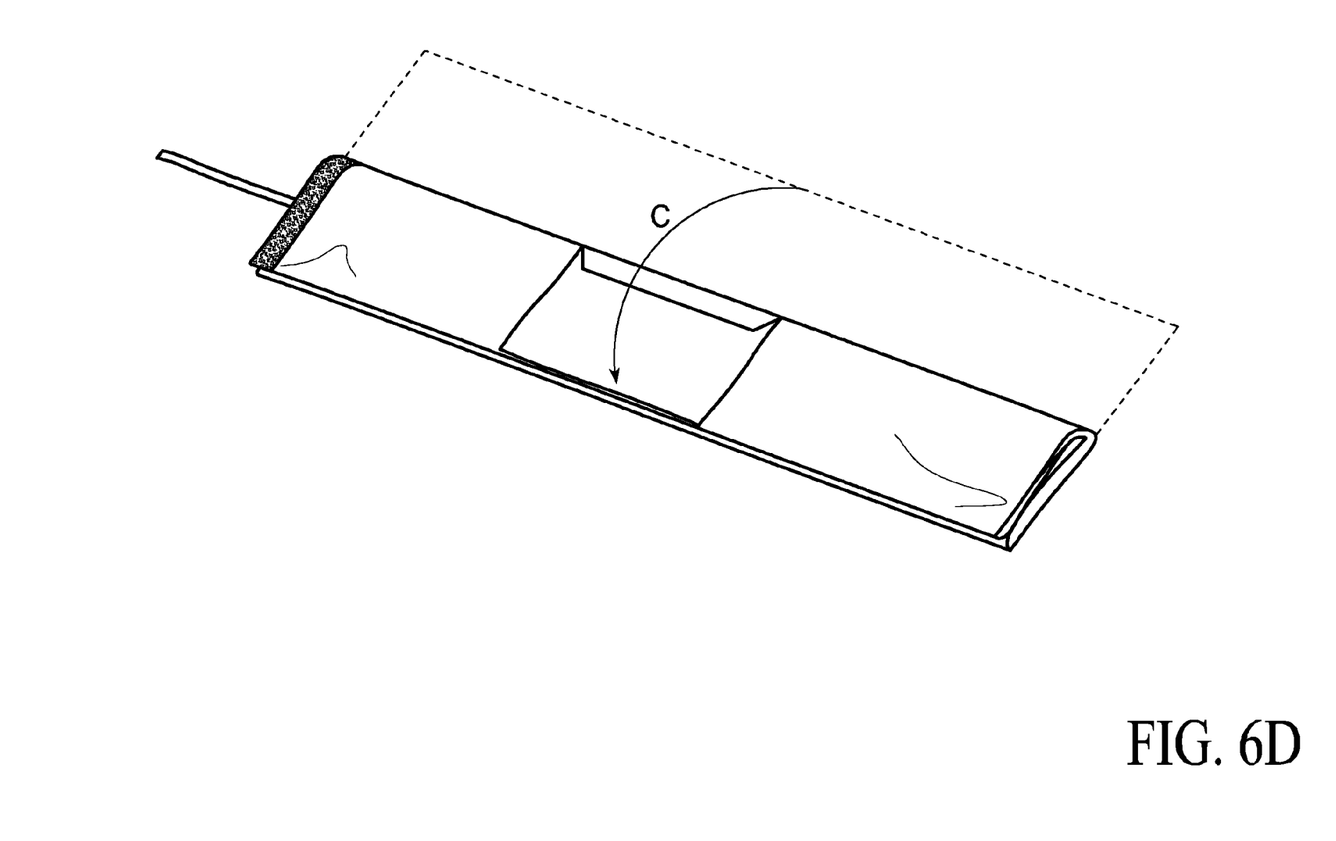
Figure 6E:
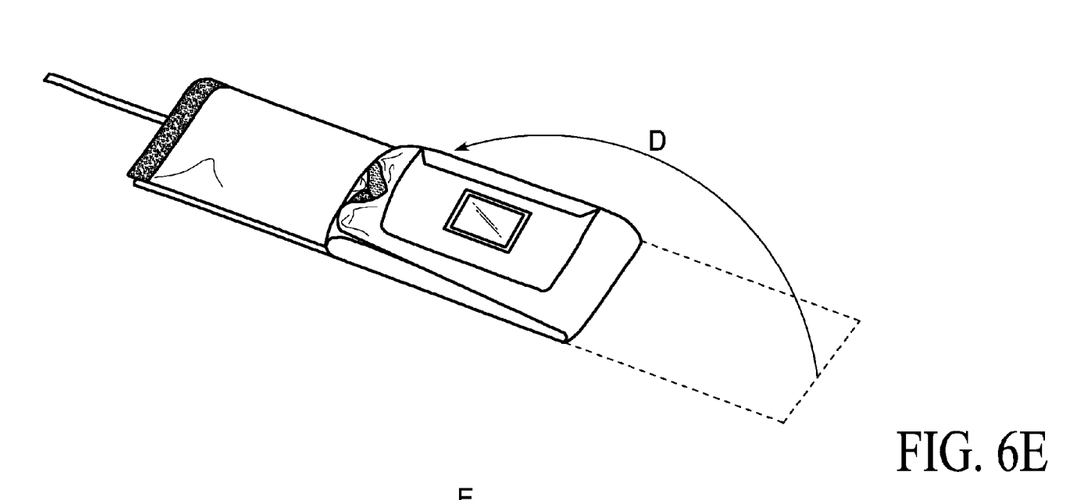
Figure 6F:
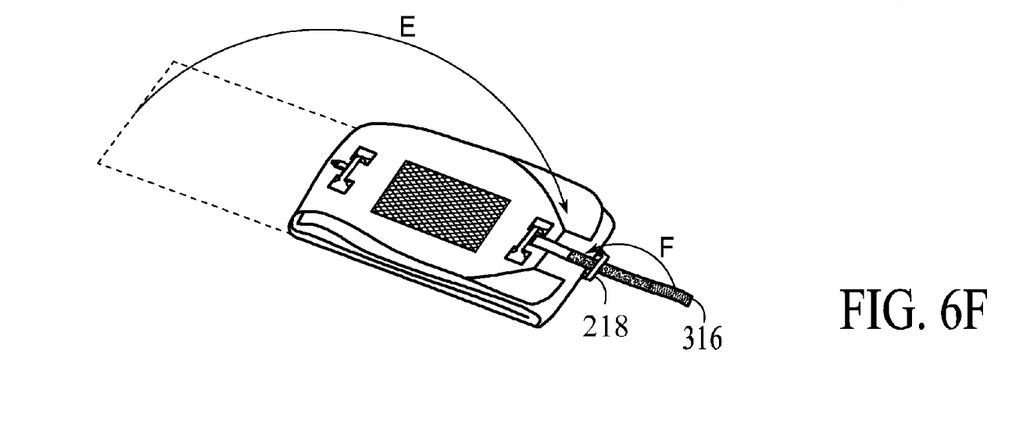

Referring now to FIGS. 6A-6F. Directional arrows A-E demonstrate how the cover 10 folds up into its storage configuration. The storage configuration may be useful to a user to ship the cover 10 independent of the bicycle 200, or may also be useful as a tote bag, backpack, or other hand-held storage bag. Referring specifically to FIGS. 6E and 6F, the configuration of the handles 216, 218 and 220 enable the cover 10 to be transitioned from the "in use" position to the storage configuration and secured in the storage configuration, such that the cover 10 does not inadvertently transfer back to an unfolded position without user input. For example, the cinch strap 316 is configured to extend from a first edge portion of the top portion 202 of the cover 10, which is proximate the handle 220. Once the cover 10 is folded as instructed by the arrow D, as shown in FIG. 6E, the result is that the handle 218 is configured proximate the crease line created by the fold D, but is yet positioned under the crease line and not visible in FIG. 6E. Thereafter, the fold E is made as shown by arrow E, as depicted in FIG. 6F, such that the handles 216 and 220 are visible, the result of which is that the cinch strap 316 is brought in relative close proximity to the crease line created by fold D, and thus relatively close to the handle 218. Thereafter, the cinch strap 316 may be drawn through the handle 218 and the hook portion 318 and the loop portion 320 of the cinch strap 316 may be functionally coupled to one another to secure the first edge portion of the top portion 202 to the handle 218 to thereby secure the folded cover 10 to itself in the stored configuration.

Figure 7:
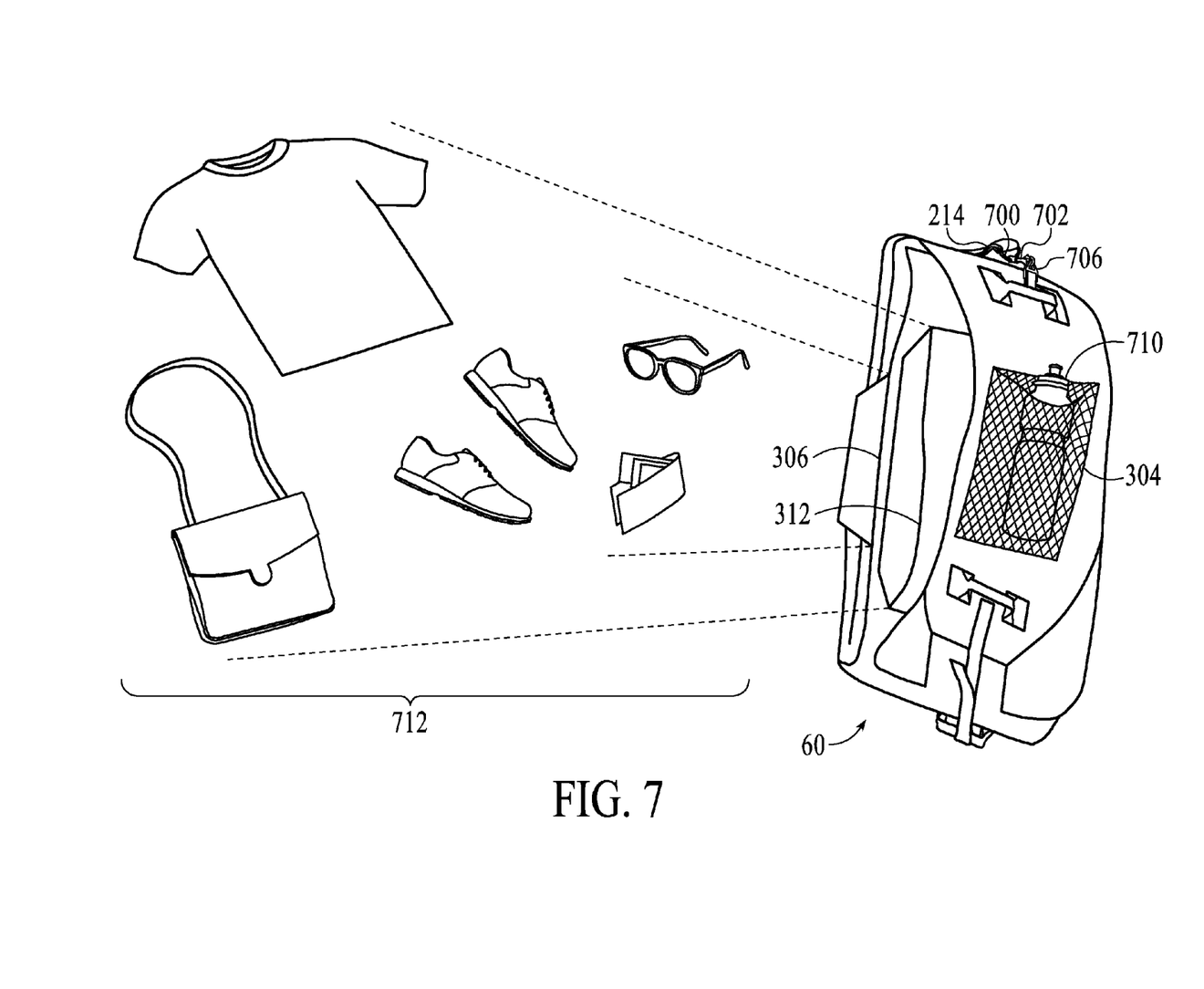
FIG. 7 is a perspective view of the bike cover in a folded position, as transformed into a backpack and showing the storage compartments therein in accordance with the present disclosure.

Referring now to FIG. 7, embodiments of the cover 10 further comprise the cover 10 being configured in the stored configuration 60. In this embodiment, the apparatus of the present invention is completely collapsed. This configuration is folded and cinched taught to be used for shipping, storage, and in-use is a backpack. In the backpack mode, at least one shoulder strap 214 is affixed to a D ring 700 which is affixed to a clip 702. Said clip 702 removably clips to anchor ring 706 which is permanently affixed to apparatus 60. Two shoulder straps 214 may be coupled to the cover 10 for use as a conventional backpack. A mesh pocket 304 is included which may be used to store a water bottle 710 or the like. Also, the configuration of the open end of the pockets 306 and 312 being positioned near an edge of the top portion 202 provides that the pockets 306 and 312 are accessible to the user even with the cover in the stored configuration 60. For example, with the flaps of pockets 306 and 312 in the open position, various articles 712 may be stored in these backpack pockets.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A cover for a bicycle, the cover comprising:
   a top portion;
   a plurality of sidewalls coupled to the top portion, the sidewalls being configured to flex with respect to the top portion;
   a plurality of coupling means configured on a perimeter of the sidewalls for releasably coupling the sidewalls to one another to define therebetween a hollow; and
   attachment means configured on an interior pocket in a bottom perimeter of each of the plurality of sidewalls, each of the interior pockets having a flap to cover a respective pocket opening, wherein under the condition that bottom edges of the respective sidewalls are coupled together via the attachment means the flaps of the respective pockets are pressed against one another and prevented from opening.

2. The cover of claim 1, wherein first edges of the respective sidewalls are releasably coupled to one another and wherein second edges of the respective sidewalls are releasably coupled to one another.

3. The cover of claim 1, further comprising attachment means in a bottom perimeter of each of the plurality of sidewalls, wherein the attachment means are configured to releasably couple a portion of the bottom edges of the respective sidewalls to one another to define coupled portions and uncoupled portions.

4. The cover of claim 3, wherein under the condition that the bicycle is configured within the hollow, a portion of each wheel of the bicycle protrudes from the uncoupled portions.

5. The cover of claim 1, wherein the top portion further comprises a top pocket, the top pocket having an open end oriented toward the one of the sidewalls.

6. The cover of claim 1, wherein one of the sidewalls further comprises an outer sidewall pocket having an open end oriented toward the top portion.

7. The cover of claim 1, wherein the cover further comprises an interior pocket configured on an interior surface of a sidewall of the plurality of sidewalls.

8. The cover of claim 1, wherein the top portion further comprises a plurality of handles configured thereon.

9. The cover of claim 8, wherein a first handle of the plurality of handles is configured centrally along the length of the top portion, a second handle of the plurality of handles is configured proximate the first edge of the top potion, and a third handle of the plurality of handles is configured on the top portion between the first and second handles.

10. The cover of claim 1, wherein the cover further comprises a retainer and an interior strap, the retainer being functionally coupled to an interior surface of the cover and the interior strap being slidably engaged by the retainer.

11. The cover of claim 10, wherein the interior strap is adjustable and is configured to functionally engage the bicycle to releasably secure the cover to the bicycle.

12. The cover of claim 10, wherein the cover further comprises a security device functionally coupled to the interior strap.

13. The cover of claim 10, wherein the cover further comprises a shoulder strap having opposing ends, each of the opposing ends being releasably coupled to an exterior surface of the top portion at a position corresponding to a position of the retainer on the interior surface.

14. The cover of claim 1, wherein the cover further comprises interior connection means configured on an interior surface of the cover and adapted to releasably couple a first end of each of the sidewalls thereto.

15. The cover of claim 1, wherein the cover is configured to fold between an in use position for use with transporting the bicycle therein and a stored position for use as a backpack, the cover further comprising a cinch strap that is configured to extend from the first end of the top portion and under the condition that the cover is in the stored position the cinch strap is drawn through a first handle in the top portion and secured to itself to secure the cover in the stored position.

16. A kit for transporting a bicycle, the kit comprising:
a bicycle frame cover, the cover comprising:
a top portion;
a plurality of sidewalls coupled to the top portion, the sidewalls being configured to flex with respect to the top portion; and
a plurality of coupling means configured on a perimeter of the sidewalls for releasably coupling the sidewalls to one another to define therebetween a hollow that covers the bicycle;
attachment means configured on an interior pocket in a bottom perimeter of each of the plurality of sidewalls, each of the interior pockets having a flap to cover a respective pocket opening, wherein under the condition that the bottom edges of the respective sidewalls are coupled together via the attachment means the flaps of the respective pockets are pressed against one another and prevented from opening; and
a bicycle wheel cover, the bicycle wheel cover comprising:
a main body defining a storage space;
a handle; and
a carrying strap,
wherein the storage space stores the bicycle wheel.

17. The kit of claim 16, wherein first edges of the respective sidewalls are releasably coupled to one another and wherein second edges of the respective sidewalls are releasably coupled to one another.

18. The kit of claim 16, wherein the frame cover further comprises a retainer and an interior strap, the retainer being functionally coupled to an interior surface of the frame cover and the interior strap being slidably engaged by the retainer.

19. The kit of claim 18, wherein the interior strap is adjustable and is configured to functionally engage the bicycle to releasably secure the frame cover to the bicycle.

* * * * *